United States Patent [19]
Brockmann et al.

[11] Patent Number: 5,265,223
[45] Date of Patent: Nov. 23, 1993

[54] PRESERVATION OF PRIORITY IN COMPUTER BUS ARBITRATION

[75] Inventors: Russell C. Brockmann; William S. Jaffe, both of Fort Collins, Colo.

[73] Assignee: Hewlett-Packard Company, Palo Alto, Calif.

[21] Appl. No.: 924,423

[22] Filed: Jul. 31, 1992

Related U.S. Application Data

[63] Continuation of Ser. No. 741,707, Aug. 7, 1991, abandoned.

[51] Int. Cl.$^5$ .............. G06F 13/00; G06F 13/36; G06F 13/368
[52] U.S. Cl. .............. 395/325; 364/DIG. 1; 364/242.6; 364/242.8; 364/242.92
[58] Field of Search .............. 395/325, 725; 364/200 MS File, 900 MS File

[56] References Cited

U.S. PATENT DOCUMENTS

| | | | |
|---|---|---|---|
| 4,237,534 | 12/1980 | Felix | 395/325 |
| 4,536,839 | 8/1985 | Shah et al. | 395/425 |
| 4,620,278 | 10/1986 | Ellsworth | 395/325 |
| 4,633,394 | 12/1986 | Georgiou et al. | 395/650 |
| 4,719,569 | 1/1988 | Ludemann et al. | 395/725 |
| 4,760,515 | 7/1988 | Malmquist et al. | 395/325 |
| 4,814,974 | 3/1989 | Narayanan et al. | 395/725 |
| 4,920,486 | 4/1990 | Nielsen | 395/325 |
| 4,949,247 | 8/1990 | Stephenson et al. | 395/800 |
| 4,953,081 | 8/1990 | Feal et al. | 395/325 |
| 4,974,148 | 11/1990 | Matteson | 395/325 |
| 4,979,099 | 12/1990 | Milia et al. | 395/325 |
| 4,987,529 | 1/1991 | Craft et al. | 395/325 |
| 5,016,162 | 5/1991 | Epstein et al. | 395/775 |
| 5,068,782 | 11/1991 | Scheuneman et al. | 395/425 |

Primary Examiner—Dale M. Shaw
Assistant Examiner—Lance L. Barry
Attorney, Agent, or Firm—Augustus W. Winfield

[57] ABSTRACT

A method and circuitry for controlling priority of devices contending for access to a data communications link. Each device capable of contending for access contains a priority register which indicates the relative priority of every device capable of contending for access. After gaining access to the link, a device may optionally signal to all devices to update priority. When priority is updated, the device signaling priority update is moved to lowest priority. Inhibiting the signal to update priority permits a device to maintain priority. Systems using the method may be configured with a fair arbitration protocol (least recently accessed has highest priority), with fixed priority protocol, or with priority protocols that can be modified in real time.

9 Claims, 6 Drawing Sheets

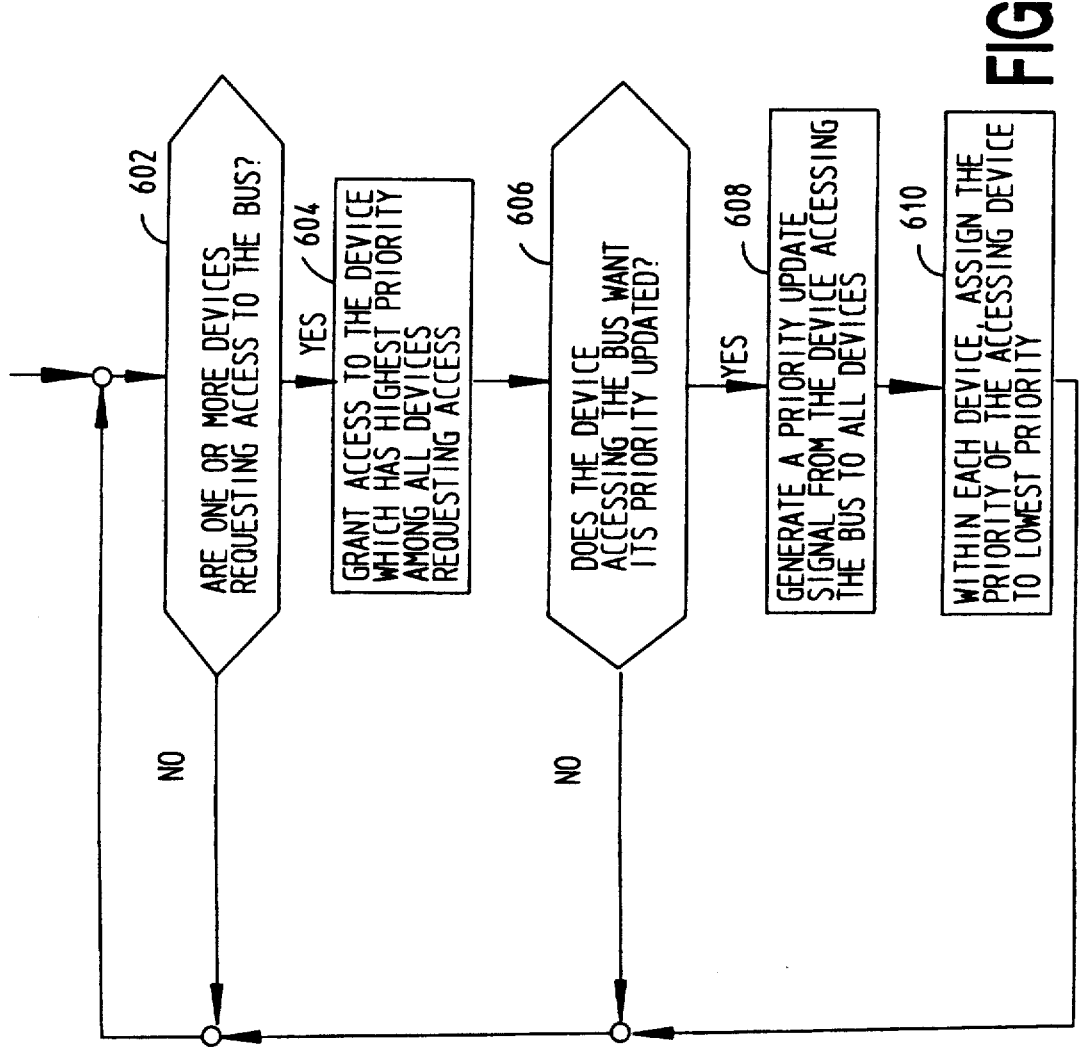

PRESERVATION OF PRIORITY IN COMPUTER BUS ARBITRATION

CROSS REFERENCE TO RELATED APPLICATION(S)

This is a continuation of copending application Ser. No. 07/741,707, filed on Aug. 7, 1991, now abandoned.

FIELD OF INVENTION

This invention relates generally to computer systems and more particularly, to arbitration of priority of access to computer data busses and networks.

BACKGROUND OF THE INVENTION

Modern computer systems often have a plurality of "intelligent" devices interconnected by a high speed communications link. Within a single computer, multiple processors may use an internal data bus to communicate with each other and with shared memory. In a distributed system, multiple computers may use a network to communicate with each other and with shared peripherals such as disk drives, tape drives and printers. Typically only one device can "talk" or "transmit" on the communications link at any one time. If several devices simultaneously contend for access to the communications link, the system must provide a protocol for deciding which device is granted access. This process is called arbitration. In some systems, access is granted randomly. In others, devices are assigned a priority so that if several devices simultaneously contend for access, access is granted to the device with the highest priority.

U.S. application Ser. No. 07/436,144 filed Nov. 13, 1989 by Ross M. Wille and Richard J. Carter entitled "Distributed Fair Arbitration Scheme for Providing Access to a Data Communication Bus" (hereinafter referred to as the Wille application) is specifically incorporated herein by reference for all that it teaches.

In this application, the word "agent" is used to describe any device capable of contending or arbitrating for access to a data communications link. In some arbitration protocols, when an agent gains access to the communications link, the accessing agent is moved to the lowest priority. As agents access the communications link and are moved to the lowest priority, the agents which have accessed the communications link least recently achieve higher priority. Thus, the protocol is a "fair" arbitration protocol which prevents one agent from locking out other agents for extended periods of time. Given N agents, the protocol guarantees that each agent will gain access to the communications link within N−1 transaction times, in the worst case, when every agent is continuously requesting access to the communications link.

The protocol described above is desirable when all agents have equal urgency of access, or where it is important to guarantee each agent access within a particular minimum time. However, in some applications it is desirable to temporarily allow one agent to maintain its priority even after it has accessed the communications link. For example, in a graphics intensive application, it may be desirable to have the flexibility to allow an application or operating system to allow a graphics computation agent to complete a graphics task before it is moved to the lowest priority. Alternatively, in a network application, it may be desirable for an agent to always send a fixed number of packets before yielding priority.

SUMMARY OF THE INVENTION

The present invention is an improvement over the protocol described above in that it provides a flexible design for allowing agents to retain priority. In the protocol above, priority is automatically updated each time an agent accesses the communications link. In the present invention, there are several options for priority update after access. Priority update occurs only when the agent gaining access sends an update signal to all other agents. The present invention retains the overall priority update method and circuitry described above but allows flexibility within individual agents to maintain priority when necessary.

BRIEF DESCRIPTION OF THE DRAWINGS

FIG. 6 illustrates the arbitration method.

DETAILED DESCRIPTION OF THE PREFERRED EMBODIMENT OF THE INVENTION

Figure 1:
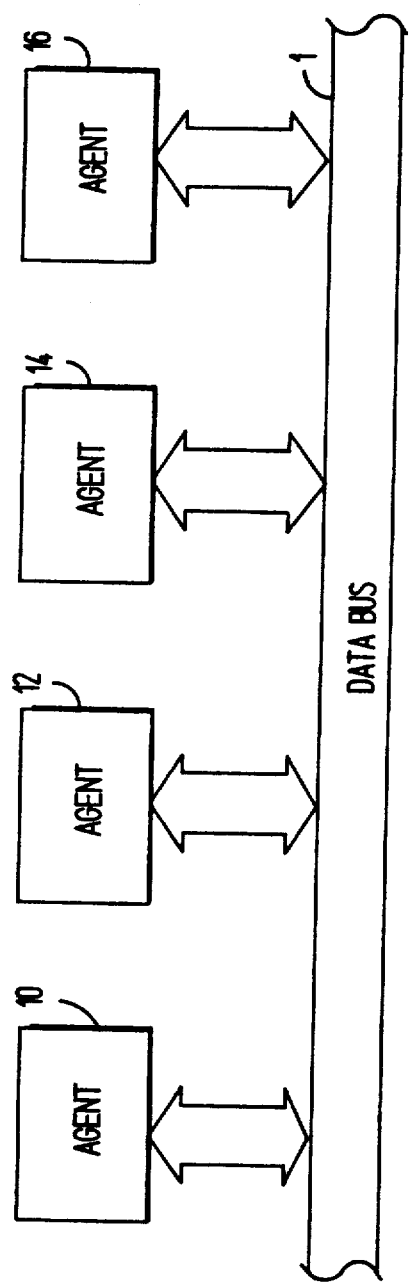
FIG. 1 is a block diagram illustrating a system of multiple agents coupled to a computer data bus or network.

FIG. 1 depicts a computer data bus or network 1, interconnecting a plurality of agents 10, 12, 14, and 16. Although the present invention can be employed equally as well with either a bus or a network, the remainder of the design description will refer to a bus 1.

Figure 2:
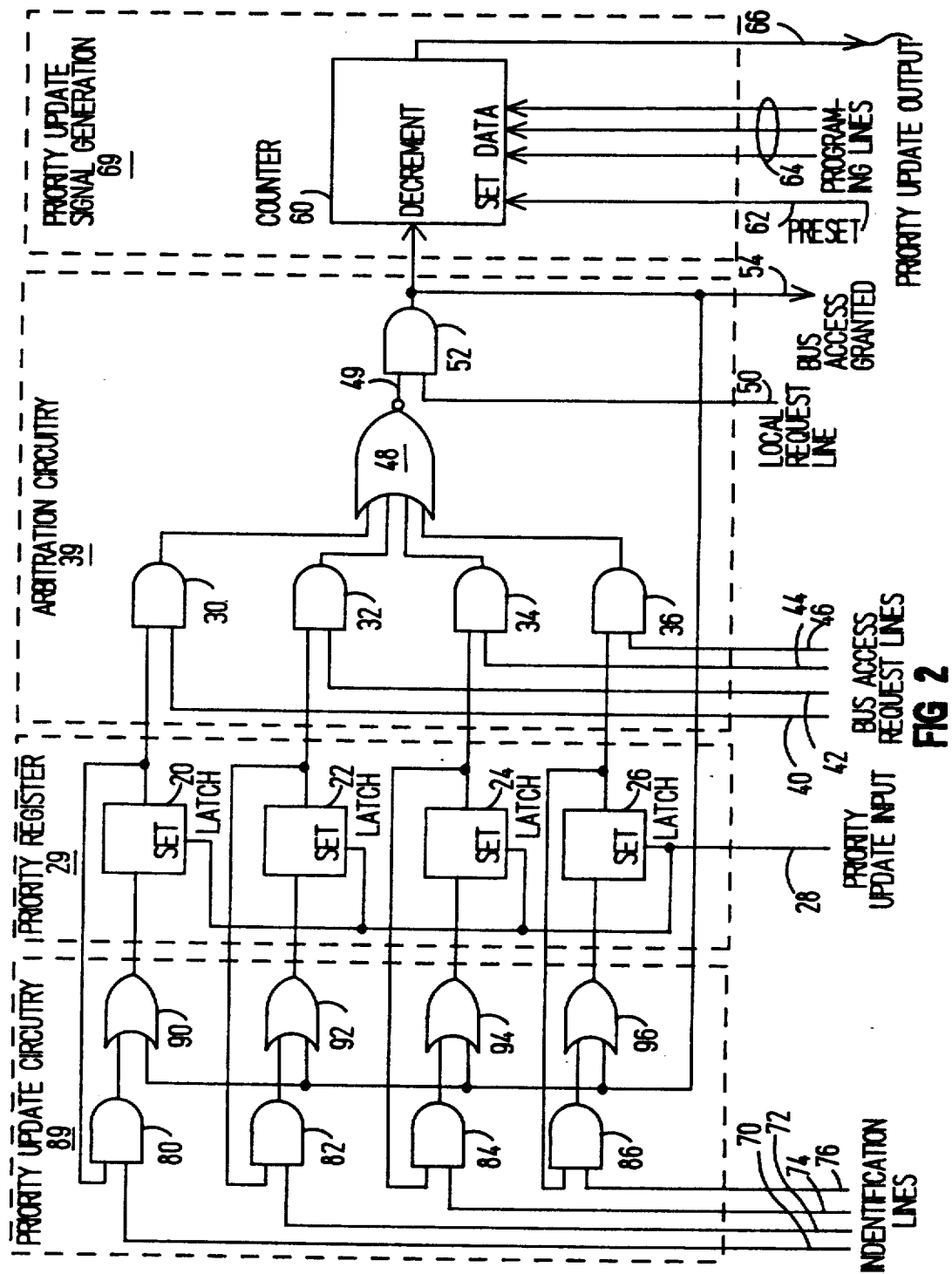
FIG. 2 is a schematic diagram illustrating an implementation of the present invention.

FIG. 2 schematically illustrates arbitration and priority update circuitry contained within each agent 10, 12, 14 and 16. The circuitry in FIG. 2 will be described in terms of four functional areas as follows: priority update circuitry 89, priority register 29, arbitration circuitry 39 and priority update signal generation circuitry 69.

As shown in FIG. 2, devices 20, 22, 24 and 26 constitute storage devices (e.g. latches) that, together, form a priority register 29 that indicates the priority state of each of the agents 10, 12, 14 and 16. Each storage device 20, 22, 24 and 26 stores a data bit corresponding to the priority state of agents 10, 12, 14 and 16 respectively. Within a particular agent, each bit indicates the priority of each of the other agents relative to that particular agent. For example, for agent 10, storage device 22 represents the priority of agent 12 relative to agent 10, storage device 24 represents the priority of agent 14 relative to agent 10 and storage device 26 represents the priority of agent 16 relative to agent 10. For agent 10, storage device 20 is redundant. Redundancy will be discussed in more detail later.

Within a particular agent, if a particular bit in priority register 29 is set to logical 1, that indicates that the corresponding agent has a higher priority than the particular agent containing the priority register 29. If a particular bit is set to logical 0, that indicates that the corresponding agent has a lower priority than the agent containing the priority register. For example, for agent 10, if storage device 22 is set to logical 1, that indicates that agent 12 has higher priority than agent 10. Likewise, if storage device 22 is set to logical 0, that indicates that agent 12 has lower priority than agent 10. In the protocol to be discussed later, a key step is to move an accessing agent to lowest priority. Within the agent being set to lowest priority, all bits in the priority register 29 are set to logical 1, thereby making all other agents have higher priority. Within all other agents, the bit in the priority register 29 corresponding to the agent being moved to lowest priority is set to logical zero, making the corresponding agent lower priority. For example, if agent 12 is to be moved to lowest priority, all bits in priority register 29 for agent 12 are set to logical 1 and within all other agents, storage device 22 is set to logical 0.

Referring again to FIG. 2, the arbitration circuitry 39 is comprised of gates 30, 32, 34, 36, 48 and 52. Bus access request lines 40, 42, 44 and 46 are driven to logical 1 by the corresponding agents 10, 12, 14 and 16, respectively, that are requesting access to the bus 1. Of course, not all of the agents will always request access to the bus 1 during the same requesting period. Typically only one, or a subset, of agents will request access to the bus 1 during the same requesting period. However, the arbitration circuitry 39 is general and as illustrated can arbitrate any combination of four requesting agents. Outputs of logical "AND" gates 30, 32, 34 and 36 are driven to logical 1 only if a corresponding agent is requesting access to the bus 1 and that agent has higher relative priority than the agent containing the priority register 29. For example, for agent 10, the output of logical "AND" gate 32 will be logical 1 only if agent 12 is requesting access to the bus 1 and agent 12 has higher priority than agent 10. Signal 49, the output of logical "NOR" gate 48, is driven to logical 1 only if no agents with a higher priority than the agent containing the arbitration circuitry 39 are requesting access to the bus 1. Local request line 50 is driven to logical 1 if the agent containing the arbitration circuitry 39 desires access to the bus 1. A bus access granted signal 54 is produced by logical "AND" gate 52 whenever the agent containing the arbitration circuitry 39 is requesting access (local request line 50 is at logical 1) and no other agents with higher priority are requesting access (output of logical "NOR" gate 48 is at logical 1). For example, for agent 10, bus access granted line 54 will be driven to logical 1 if agent 10 is requesting access to the bus 1 and no agents with higher priority than agent 10 are requesting access to the bus 1.

From the preceding discussion it can be seen that the arbitration circuitry 39 within a particular agent indicates to the particular agent and all other agents whether or not the particular agent containing the arbitration circuitry 39 has gained access to the bus 1. However, if an agent other than the particular agent containing arbitration circuitry 39 gains access to the bus 1, that information must come from the other agent which gained access to the bus 1. For example, for agent 10, the arbitration circuitry 39 within agent 10 indicates to agent 10 and all other agents via bus access granted signal 54 whether or not agent 10 gained access to the bus 1. However, the arbitration circuitry within agent 10 cannot identify another agent which might have gained access to the bus 1 instead of agent 10. Referring again to FIG. 2, identification lines 70, 72, 74 and 76 are signals from agents 10, 12, 14 and 16 respectively, identifying which agent gained access to bus 1. An identification line 70, 72, 74 or 76 will be driven to logical 0 (note the logical inversion) if the corresponding agent gained access to the bus 1. For example, if agent 10 gains access to the bus 1, that status is signalled from agent 10 by bus access granted signal 54 and the status is received by agents 10, 12, 14 and 16 by identification line 70. For agent 10, identification line 70 is redundant.

Before discussing the priority update circuitry 89 in detail, it is helpful to outline the overall update function. A key element of this invention is that the relative priority of agents is changed only when an agent gaining access to the bus 1 sends a signal to all agents that priority should be updated. For the agent gaining access, this output signal is the priority update output signal 66 which will be discussed later. The corresponding input signal for all agents is priority update input signal 28. If an accessing agent signals that priority should be updated, priority registers in all agents are updated, moving the accessing agent to the lowest priority. As discussed above, within the accessing agent, this is accomplished by setting all bits in the priority register 29 to logical 1, thereby making all other agents have higher priority than the accessing agent. Within each agent other than the accessing agent, the bit within the priority register 29 corresponding to the accessing agent is set to logical 0, thereby making the accessing agent have lower priority than each other agent.

Referring again to FIG. 2, the priority update circuitry 89 is comprised of gates 80, 82, 84, 86, 90, 92, 94 and 96. Priority update input signal 28 is logically connected to each storage device 20, 22, 24 and 26 within priority register 29. When priority update input signal 28 is driven to logical 1, each storage device 20, 22, 24 and 26 within priority register 29 is reset, latching the data presented by the respective outputs of logical "OR" gates 90, 92, 94 and 96. The output of priority update circuitry 89 is not stored in storage devices 20, 22, 24 and 26 within priority register 29 unless the priority update signal 28 is driven to logical 1. If the agent containing the priority update circuitry 89 is an accessing agent, the goal is to set all the bits in priority register 29 to logical 1. This setting means is accomplished by driving bus access granted signal 54 to logical 1 which in turn forces the outputs of logical "OR" gates 90, 92, 94 and 96 to logical 1.

If the agent containing the priority update circuitry 89 is not an accessing agent, the goal is to set one element in the priority register 29 to logical 0. This clearing function is accomplished as follows. If the agent containing the priority update circuitry 89 is not an accessing agent, bus access granted signal 54 will be driven to logical 0. The outputs of logical "OR" gates 90, 92, 94 and 96 will then correspond to the outputs of logical "AND" gates 80, 82, 84 and 86, respectively. Identification lines 70, 72, 74 and 76 each drive an input of logical "AND" gates 80, 82, 84 and 86 respectively. An identification line 70, 72, 74 or 76 will be driven to logical 0 if a corresponding agent has gained access to the bus 1. This in turn causes the output of logical "AND" gates 80, 82, 84 and 86 to be logical 0 if a corresponding agent has gained access to the bus 1. Alternatively, if an agent has not accessed the bus 1, the corresponding identification line 70, 72, 74 or 76 will be driven to logical 1. The outputs of corresponding logical "AND" gates 80, 82, 84 and 86 will then be logically identical to the output of the corresponding storage device 20, 22, 24 and 26.

The following example illustrates the above priority update discussion. For the example, consider the priority update circuitry in agent 10. First consider the case where agent 10 is the accessing agent. Within agent 10, bus granted signal 54 will be logical 1. Logical "OR" gates 90, 92, 94 and 96 will then drive their respective outputs and the corresponding priority register inputs to logical 1. Next, consider the case where agent 12 has gained access to the bus 1. Agent 12 will drive identification line 72 to logical 0 causing the output of logical "AND" gate 82 to be driven to logical 0. The output of logical "OR" gate 92 will be then be driven to logical 0. Identification lines 70, 74 and 76 will be driven to logical 1 by agents 10, 14, and 16, respectively. The outputs of logical "AND" gates 80, 84 and 86 will then be identical to the outputs of priority register elements 20, 24 and 26, respectively. The outputs of logical "AND" gates 80, 84 and 86 will then force outputs of logical "OR" gates 90, 94 and 96 to be logically equivalent to outputs from priority register elements 20, 24 and 26 respectively. Priority register element 22 will then be set to logical 0. All other elements will be set to their previous states.

FIG. 2 also shows that bus access granted signal 54 is applied to priority update signal generating circuity 69, such as counter 60, which in turn produces a priority update output signal 66. When preset line 62 is driven to logical 1, counter 60 is initialized to a count equal to the count represented by programming lines 64. Each time bus access granted signal 54 is driven to logical 1, counter 60 is decremented. When counter 60 reaches a value of zero, counter 60 drives priority update output signal 66 to logical 1. Priority update output signal 66 is the signal to all agents to update priority.

For example, for agent 10, programming lines 64 will define an initial count N. After N bus accesses by agent 10, counter 60 will drive priority update output signal 66 to logical 1. This information is received by all agents by priority update input signal 28. Within each agent, priority update input signal 28 will cause the priority register 29 to be updated. Within agent 10, all storage devices 20, 22, 24 and 26 will be latched to logical 1, thereby making agent 10 the lowest priority agent. Within agents 12, 14 and 16, storage device 20 will be latched to logical 0, thereby making agent 10 lower priority than agents 12, 14 and 16. It should be noted that other higher priority agents may still gain access to bus 1 during the N times that agent 10 accesses the bus 1. If a higher priority agent gains access to the bus 1 and generates a priority update output signal 66, agent 10 will rise in relative priority. However, agent 10 will not initiate the signal to make agent 10 the lowest priority agent until agent 10 has accessed the bus 1 N times.

The present invention requires that some means be present to initialize all agents to some initial relative priority. From that time on, relative priority for a particular agent depends upon how recently the particular agent has generated a priority update output signal 66 relative to other agents. The present invention also provides means (not shown) to generate preset signal 62 and programming lines 64 to preset counter 60 each time priority update output signal 66 is generated. In the preferred embodiment, these signals are coupled to the bus 1 thereby permitting the count to be generated by another agent.

The logic shown in FIG. 2 is generic for all the agents. However, the logic includes redundant logic which must be eliminated or nullified within each agent. For example, for agent 10, the state of priority register bit 20 should be ignored. This can be implemented for example within agent 10 by disabling bus access request line 40 as an input to logical "AND" gate 30.

Figure 3:
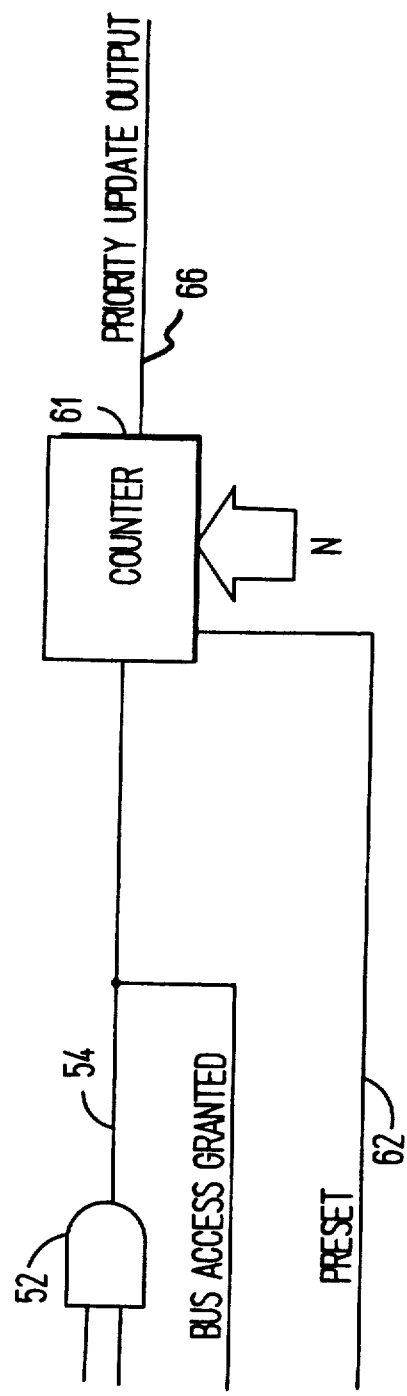
FIG. 3 illustrates an alternative embodiment of the priority update circuit.

FIG. 3 illustrates an alternative priority update signal generating means wherein a counter 61 with a fixed preset value N is used instead of a variable preset counter with variable programming lines as illustrated in FIG. 2. Such a fixed preset counter might be used, for example, in a network where an agent needs to send a fixed number of packets before changing its priority to be the lowest priority agent. Preset signal 62 will cause counter 61 to be initialized to value N. Of course, a fixed counter could also be implemented as a special case of a programmable counter such as counter 60 illustrated in FIG. 2. The present invention also provides means (not shown) for generating preset signal 62 to preset counter 61 each time priority update output signal 66 is generated. In the preferred embodiment, preset signal 62 is generated within the agent containing counter 61 by logically coupling priority update output signal 66 to preset signal 62.

Figure 4:
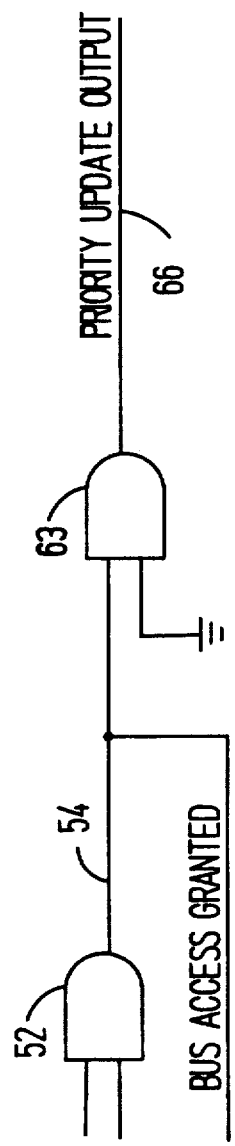
FIG. 4 illustrates another alternative embodiment of the priority update circuit.

FIG. 4 illustrates another alternative priority update signal generating means wherein the priority update output signal 66 is coupled to logic 0. A logical "AND" gate 63 with one input disabled illustrates one way to implement logic 0. In this embodiment, the particular agent never relinquishes priority. If only one such agent exists in a network system, that agent will eventually rise to the highest priority as other agents access the bus 1. If more than one such agent exists in a network, all agents with suppressed priority update generating means will rise in priority as other agents access the bus 1 but all of the agents with suppressed priority update generating means will retain their initial priority order relative to each other.

Figure 5:
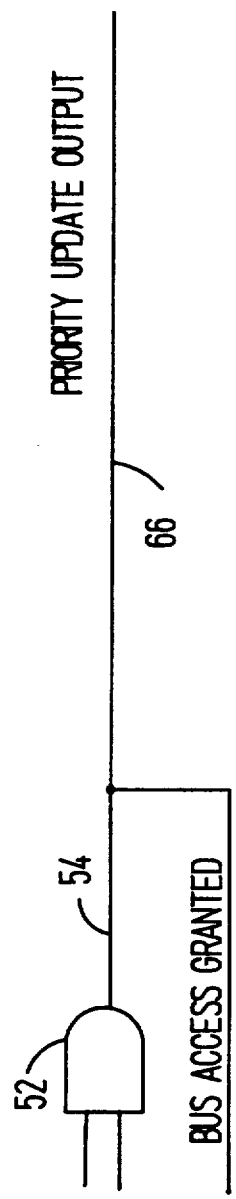
FIG. 5 illustrates still another alternative embodiment of the priority update circuit.

FIG. 5 illustrates still another alternative priority update signal generating means wherein an agent generates a priority update output signal 66 each time the agent accesses the bus 1. In this case, the particular agent would change its priority to the lowest priority agent every time it accessed the bus 1.

In the present invention, agents with priority update signal generating means as illustrated in FIGS. 2, 3, 4 and 5 can be freely mixed within a system, giving the system designer flexibility in controlling each agent's priority. For example, agent 10 might have a programmable counter as illustrated in FIG. 2, agent 12 might have a preset counter as illustrated in FIG. 3, agent 14 might have a suppressed priority update output signal as illustrated in FIG. 4, and agent 16 might generate a priority update output signal every time agent 16 accesses the bus 1 as illustrated in FIG. 5. If completely generic circuitry is desired for all agents, programmable counter 60, as illustrated in FIG. 2, could be programmed to implement any of the modes illustrated in FIGS. 3, 4 and 5.

From the preceding description of the present invention, it can be seen that the present invention overcomes the disadvantages and limitations of the prior art by allowing design flexibility within agents to maintain priority when required, while maintaining a consistent common design with distributed arbitration circuitry and an overall "fair" arbitration protocol.

The foregoing description of the present invention has been presented for purposes of illustration and description. It is not intended to be exhaustive or to limit the invention to the precise form disclosed, and other modifications and variations may be possible in light of the above teachings. For example, each of the following variations can be implemented by one skilled in the art:

A. FIG. 1 illustrates four agents and FIG. 2 illustrates circuitry for four agents. In general, there can be an arbitrary number of agents. The circuitry in FIG. 2 may be expanded to accommodate the largest number of agents allowed in a particular system.

B. Signal lines as shown in FIG. 2 may be dedicated lines separate from other data and address lines, they may be encoded and decoded, they may be time multiplexed lines shared by other data and address information, or some combination. For example, if the system can accommodate 16 agents, there will be 16 bus access granted lines (line 54 in FIG. 2), 16 identification lines (lines 70, 72, 74 and 76 in FIG. 2) and 16 bus access request lines (lines 40, 42, 44 and 46 in FIG. 2). The 16 bus access granted lines can be encoded into 4 physical bus lines by an encoder within an active bus. The corresponding identification lines can be decoded back into 16 lines within each agent. Likewise, the 16 bus access request lines can be encoded into 4 bus lines. Since identification signals and bus access request signals occur at different times, the required 4 bus lines can be physically shared by time multiplexing.

C. Instead of having each agent control priority update, the network could be implemented with a "master" agent controlling when a priority access update input signal is allowed to be received by all agents.

D. Programming lines 64 illustrated in FIG. 2 and preset signal 54 illustrated in FIGS. 2 and 3 might be controlled by a software application, a "master" controller, or they might be under the control of the agent in which they reside.

The preceding embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a computer system having two or more devices connected to a shared bus, wherein the computer system has a distributed arbitration system for access to the bus in which each of the devices has an arbitration priority and the arbitration priority of all of the devices is maintained within each of the devices, and wherein if more than one of the devices requests access to the bus, the distributed arbitration system grants exclusive access to the bus to the device requesting access which has the highest arbitration priority of all of the devices requesting access to the bus, a priority update system comprising:

update signal generation means, within each of the devices, for generating a priority update signal;

priority update means, within each of the devices, for changing the arbitration priority of the device which is accessing the bus, in response to the priority update signal if the priority update signal is generated by the update signal generation means within the device which is accessing the bus;

update signal communication means, coupled to every update signal generation means and to every priority update means, for communicating the priority update signal from the update signal generation means of the device which is accessing the bus to the priority update means of all of the devices; and, update signal control means, within each of the devices and connected to the update signal generation means, for controlling whether the priority update signal is or is not generated by the update signal generation means of the device which is accessing the bus, thereby controlling whether the arbitration priority of the device which is accessing the bus is to be subsequently changed after it relinquishes its exclusive access to the bus.

2. A system as in claim 1 wherein the update signal control means in a particular device further comprises:
programmable counter means for suppressing generation of the priority update signal for a programmable number of bus accesses by the particular device.

3. A system as in claim 1 wherein the update signal control means in a particular device further comprises:
fixed counter means for suppressing generation of the priority update signal for a fixed number of bus accesses by the particular device.

4. A system as in claim 1 wherein the update signal control means in one or more particular devices but less than all devices further comprises:
suppressed update means for permanently suppressing generation of the priority update signal by the update signal generation means within the particular devices.

5. A system as in claim 1 wherein the priority update means within each device changes the arbitration priority of the device which is accessing the bus to lowest priority if the update signal generation means within the device which is accessing the bus generates the priority update signal.

6. A system as in claim 5 wherein the update signal control means in a particular device further comprises:
programmable counter means for suppressing generation of the priority update signal for a programmable number of bus accesses by the particular device.

7. A system as in claim 5 wherein the update signal control means in a particular device further comprises:
fixed counter means for suppressing generation of the priority update signal for a fixed number of bus accesses by the particular device.

8. A system as in claim 5 wherein the update signal control means in one or more particular devices but less than all devices further comprises:
suppressed update means for permanently suppressing generation of the generation of the priority update signal by the update signal generation means within the particular devices.

9. In a computer system having two or more devices connected to a shared bus, wherein the computer system has a distributed arbitration system for access to the bus in which each of the devices has an arbitration priority and the arbitration priority of all of the devices is maintained by priority update circuitry within each of the devices, and wherein if more than one of the devices requests access to the bus, the distributed arbitration system grants exclusive access to the bus to the device requesting access which has the highest arbitration priority of all of the devices requesting access to the bus, a priority update method comprising the following steps:

controlling by priority update suppression circuitry, within the device which is accessing the bus, whether or not its arbitration priority should be updated;

generating the priority update signal by update signal generation circuitry, within the device which is accessing the bus, only if its arbitration priority is to be updated;

receiving the priority update signal by the priority update circuitry within each of the devices on the bus; and, changing the arbitration priority of the device which is accessing the bus by the priority update circuitry within each device, to lowest priority relative to each of the other devices if the priority update signal is sent by the device which is accessing the bus, thereby enabling the device which is accessing the bus to control whether or not its arbitration priority is changed after it relinquishes its exclusive access to the bus.

* * * * *